United States Patent
Kunapareddy et al.

(10) Patent No.: US 10,442,276 B2
(45) Date of Patent: Oct. 15, 2019

(54) DOOR CURTAIN MOUNTING STRUCTURE FOR VEHICLE

(71) Applicants: HYUNDAI MOTOR COMPANY, Seoul (KR); KIA MOTORS CORPORATION, Seoul (KR)

(72) Inventors: Naresh Kunapareddy, Andra Pradesh (IN); Si Yun Kim, Anyang-si (KR); Pavan Kumar Ch, Andra Pradesh (IN)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/937,045

(22) Filed: Mar. 27, 2018

(65) Prior Publication Data

US 2019/0193540 A1 Jun. 27, 2019

(30) Foreign Application Priority Data

Dec. 27, 2017 (IN) .............................. 201711046926

(51) Int. Cl.
  *B60J 1/20* (2006.01)
  *B60J 10/76* (2016.01)
  *B60J 5/04* (2006.01)

(52) U.S. Cl.
  CPC ........... *B60J 1/2063* (2013.01); *B60J 1/2086* (2013.01); *B60J 5/0402* (2013.01); *B60J 10/76* (2016.02)

(58) Field of Classification Search
  CPC ........ B60J 10/76; B60J 5/0402; B60J 1/2086; B60J 1/2063

USPC .................................................. 296/152, 97.7
See application file for complete search history.

(56) References Cited

U.S. PATENT DOCUMENTS

| 5,089,912 | A | * | 2/1992 | Simin | ..................... B60J 1/2041 160/370.22 |
| 8,663,535 | B2 | * | 3/2014 | Larcom | ............... B60R 13/0243 264/319 |
| 10,118,651 | B2 | * | 11/2018 | Dureiko | ................ B62D 27/023 |
| 2014/0132025 | A1 | * | 5/2014 | Usami | .................... B60J 1/2063 296/97.8 |
| 2016/0096417 | A1 | * | 4/2016 | Lee | ......................... B60J 1/2063 160/239 |

(Continued)

FOREIGN PATENT DOCUMENTS

DE 10123801 A1 * 11/2001 ............ B60J 1/2063
JP 2012046076 A * 3/2012 ................. B60J 3/00

*Primary Examiner* — Jason S Morrow
(74) *Attorney, Agent, or Firm* — Morgan, Lewis & Bockius LLP

(57) ABSTRACT

A door curtain mounting structure for a vehicle includes a door panel having a door inner panel disposed and a door outer panel disposed inside and outside thereof, respectively, in a width direction of the vehicle, and a receiving space formed between the door inner panel and the door outer panel; a door frame coupled to the door panel in order to form a door window opened and closed by a window glass; a door trim disposed inside the door inner panel in the width direction of a vehicle; and a door curtain housing in which a door curtain blocking the window glass inside in the width direction of a vehicle is received, the door curtain coupled to the door trim and disposed between the door inner panel and the door outer panel, so that the door curtain is coupled to the door frame to increase a door stiffness.

14 Claims, 10 Drawing Sheets

(56) References Cited

U.S. PATENT DOCUMENTS

2017/0158032 A1* 6/2017 Yun .................. B60J 1/2086
2018/0134126 A1* 5/2018 Kim .................. B60J 10/75

* cited by examiner

DOOR CURTAIN MOUNTING STRUCTURE FOR VEHICLE

RELATED APPLICATIONS

This application claims the benefit of Indian Patent Application No. 201711046926 filed on Dec. 27, 2017, the disclosure of which application is incorporated by reference herein.

TECHNICAL FIELD

The present disclosure relates to a door curtain mounting structure for a vehicle, and more particularly, the present disclosure relates to a door curtain mounting structure for a vehicle capable of increasing the stiffness of a door frame and reducing weight and cost of the door frame by incorporating a door curtain into the door frame.

BACKGROUND

Generally, a door for a vehicle is provided with a door window for improving ventilation of air inside the vehicle, a visibility and a residence of passenger, and a window glass for opening and closing the door window is installed.

The window glass is typically formed of a transparent glass material through which light can pass. However, in some cases, it is necessary to block the light coming into an interior of the vehicle through the window glass or cover the window glass so that an inside of the vehicle cannot be seen from outside.

For this purpose, the door window is equipped with a door curtain to cover the window glass from the inside of the vehicle.

A conventional door curtain device for a vehicle includes a door curtain that can block the light, a curtain roll which is disposed in the space between a door panel and a door trim and the door curtain is wound into, a hook provided at the door curtain, a locking portion provided at a door frame which is coupled to the door panel so as to form a door window and detachably engaged with the hook, and the likes.

However, in the conventional door curtain device as described above, there has been a need for a new door curtain mounting structure that can increase rigidity of the door and reduce weight and cost by integrating the door frame and the door curtain.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a door curtain mounting structure for a vehicle having advantages of increasing the stiffness of a door frame and reducing weight and cost by incorporating a door curtain into the door frame.

A door curtain mounting structure for a vehicle according to an exemplary embodiment of the present disclosure may include a door panel having a door inner panel disposed and a door outer panel disposed inside and outside thereof, respectively, in a width direction of the vehicle, and a receiving space formed between the door inner panel and the door outer panel; a door frame coupled to the door panel in order to form a door window opened and closed by a window glass; a door trim disposed inside the door inner panel in the width direction of a vehicle; and a door curtain housing in which a door curtain blocking the window glass inside in the width direction of a vehicle is received, the door curtain coupled to the door trim and disposed between the door inner panel and the door outer panel.

An inner rail may be coupled to the door inner panel and an outer rail may be coupled to the door outer panel.

An inner belt may be attached at a portion where the door inner panel and the inner rail are coupled to each other.

An outer side belt may be attached at a portion where the door outer panel and the outer rail are coupled to each other.

An extended flange may be provided at one side of the door curtain housing and an inside belt may be hung on the extended flange.

A cover shutting, a portion of the inside belt and an end portion of the extended flange from a top portion of the inside belt, may be provided at an upper portion of the door curtain housing.

The door frame may include a center pillar portion of which a first end portion is coupled to the door panel and a second end portion is formed to be extended in a height direction of a vehicle, and faced to a center pillar of a vehicle body when a door of a vehicle is closed; a roof portion formed to be extended from the second end portion of the center pillar portion in a length direction of a vehicle and faced to a roof of the vehicle body when the door is closed; and a division channel being coupled to the roof portion to be extended downward in the height direction of a vehicle and separating an opening/closing window and a fixed window of the door.

The center pillar portion may include a pillar portion formed to be extended in the height direction of a vehicle; and a protrusion portion protruded from the pillar portion in the width direction of a vehicle. A first receiving groove, a second receiving groove, and a third receiving groove of the center pillar portion, each having an opening at one side thereof, may be formed at the protrusion portion, the first and second receiving grooves of the center pillar portion may be disposed in the width direction of a vehicle and the third receiving groove of the center pillar portion may be disposed forward with respect to the first receiving groove in the length direction of a vehicle.

A door glass run for supporting the window glass may be inserted into the first receiving groove of the center pillar portion, a door weather strip may be inserted into and attached at the third receiving groove of the center pillar portion and a portion of the door curtain may be inserted into the second receiving groove of the center pillar portion.

A guide rail may be inserted into and mounted at the second receiving groove of the center pillar portion, a slider may be attached at left and right edges of the door curtain, and the slider may be inserted into and coupled to the guide rail to be moved along the guide rail.

The roof portion may include a roof body extended in the length direction of a vehicle and a downward protrusion portion protruded downward from the roof body in the height direction of a vehicle. Three of first, second and third receiving grooves of the roof portion, each having an opening at one side thereof, may be formed at the downward protrusion portion, the first and second receiving grooves of the roof portion may be opened downward in the height direction of a vehicle and the third receiving groove of the roof portion may be opened upward in the height direction of a vehicle.

The door glass run may be inserted into and mounted at the first receiving groove of the roof portion and a rim may be mounted at an upper edge of the door curtain. The rim of the door curtain may be inserted into the second receiving groove of the roof portion when the door curtain is extended to block the window glass, and the door weather strip may be inserted into and attached at the first receiving groove of the roof portion.

The division channel may include a channel body extended in the height direction of a vehicle, and a first receiving groove and a second receiving groove opened in a forward direction of the vehicle and a third receiving groove opened in a rear direction of the vehicle may be provided at the channel body.

The door glass run may be inserted into and attached at the first receiving groove of the division channel, the guide rail may be inserted into and attached at the second receiving groove of the division channel, and the slider of the door curtain may be movably coupled to the guide rail.

A weather strip may be inserted into and attached at the third receiving groove of the division channel and a fixed window glass may be inserted into and supported by the weather strip.

In accordance with the door curtain mounting structure according to the an exemplary embodiment of the present disclosure, it is possible to increase the stiffness of the door frame by combining the door curtain and the door frame, reduce weight and cost, and shorten assembly process and assemble and the like.

BRIEF DESCRIPTION OF THE DRAWINGS

These drawings are for reference purposes only and are not to be construed as limiting the technical idea of the present disclosure to the accompanying drawings.

DETAILED DESCRIPTION

Figure 1:
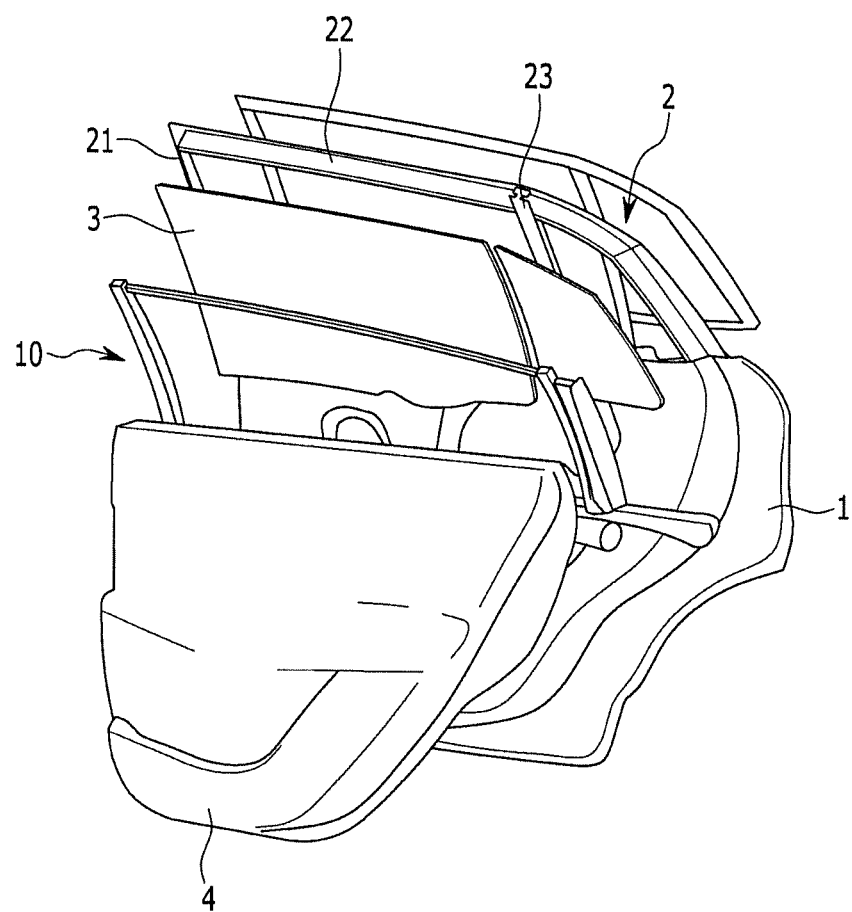
FIG. 1 is an exploded perspective view of a door for a vehicle having a door curtain mounting structure for a vehicle according to an exemplary embodiment of the present disclosure.

Hereinafter, the present disclosure will be described more fully hereinafter with reference to the accompanying drawings, in which exemplary embodiments of the invention are shown.

As those skilled in the art would realize, the described embodiments may be modified in various different ways, all without departing from the spirit or scope of the present disclosure.

In order to clearly illustrate an exemplary embodiment of the present disclosure, the parts not related to the description are omitted, and the same reference element is assigned to the same or similar constituent elements throughout the specification.

However, since the size and thickness of each element shown in the drawing are arbitrarily shown for convenience of explanation, the present disclosure is not necessarily limited to that shown in the drawing, and the thickness is enlarged to clearly represent the various parts and regions.

In the following description, to distinguish the names of the elements into first, second, and the like is to distinguish these because the names of the elements are the same, and it is not necessarily limited to the order.

Throughout the specification, unless explicitly described to the contrary, the word "comprise" and variations such as "comprises" or "comprising", will be understood to imply the inclusion of stated elements but not the exclusion of any other elements.

Figure 2:
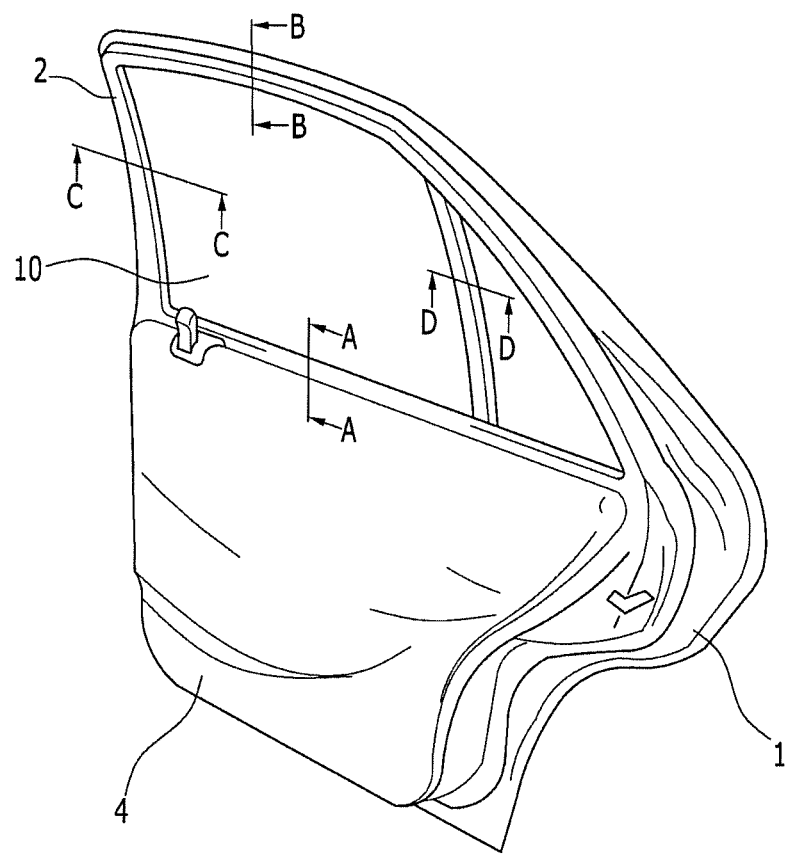
FIG. 2 is a perspective view of a door for a vehicle having the door curtain mounting structure for the vehicle according to an exemplary embodiment of the present disclosure.
Figure 2:
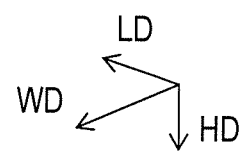

Referring to FIG. 1 and FIG. 2 according to an exemplary embodiment of the present disclosure, a door for a vehicle, having a door curtain mounting structure for a vehicle, may include a door panel 1 with an open top and receiving space inside; a door frame 2 coupled to the top of the door panel 1 and forming a door window; a window glass 3 which is raised and lowered to open and close a door window; and a door trim 4 coupled to an interior of the door panel 1 facing the passenger compartment and forming a receiving space between the door panel 1 and the door trim 4, and the like.

A door curtain 10 may be inserted in the receiving space between the door trim 4 and the door panel 1, and can block the light entering the interior of the passenger compartment through the inside surface of the window glass 3 facing the inside of the passenger compartment.

The door frame 2 may include a center pillar portion 21 of which one end portion is coupled to the door panel 1 and the other end portion is formed to be extended in a height direction HD of a vehicle, and faced to a center pillar of a vehicle body when a door of a vehicle is closed; a roof portion 22 formed to be extended from the other end portion of the center pillar portion 21 in a length direction LD of a vehicle and faced to a roof of the vehicle body when the door is closed; and a division channel 23 being coupled to the roof portion 22 to be extended downward in the height direction HD of a vehicle and separating an opening/closing window and a fixed window of the door.

Figure 3:
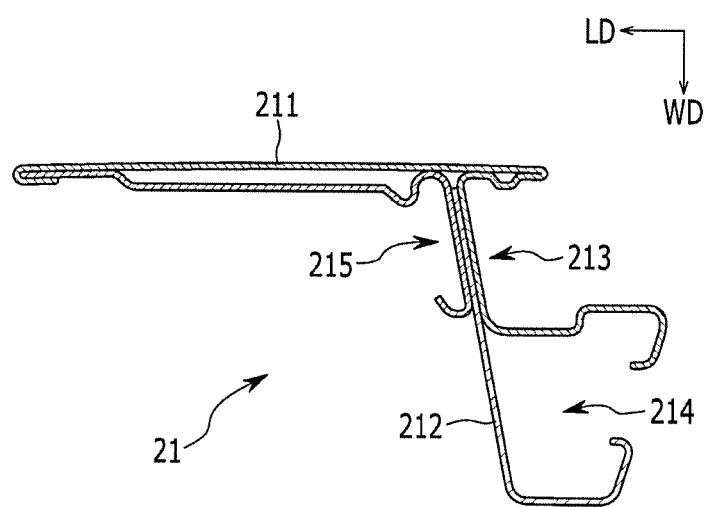
FIG. 3 is a cross-sectional view of a center pillar portion of a door frame at section C-C in FIG. 2 according to an exemplary embodiment of the present disclosure.

Referring to FIG. 3, a cross-sectional view of the center pillar portion 21 of the door frame 2 at section C-C in FIG. 2 according to an exemplary embodiment of the present disclosure, the center pillar portion 21 may include a pillar portion 211 formed to be extended in the height direction HD of a vehicle and a protrusion portion 212 protruded from the pillar portion 211 in a width direction WD of a vehicle.

Three of first, second and third receiving grooves 213, 214 and 215 each having an opening at one side thereof may be formed at the protrusion portion 212.

The first and second receiving grooves 213, 214 may be disposed in the width direction WD of a vehicle and the third receiving groove 215 may be disposed forward with respect to the first receiving groove 213 in the length direction LD of a vehicle.

Figure 4:
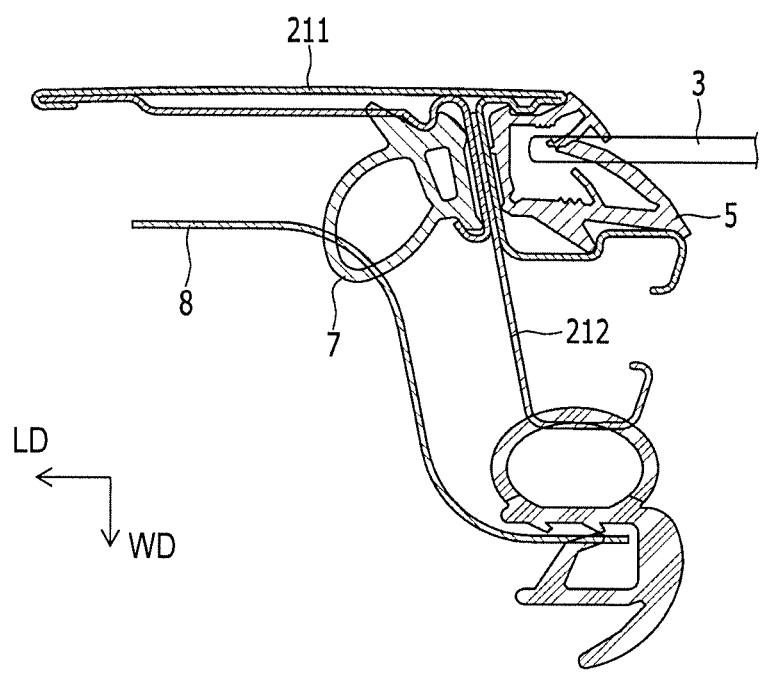
FIG. 4 is a cross-sectional view of the center pillar portion of the door frame at section C-C in FIG. 2 when the door for the vehicle is closed according to an exemplary embodiment of the present disclosure.

Referring to FIG. 4, a door glass run 5 may be inserted in and mounted at the first receiving groove 213 of the center pillar portion 21, and the window glass 3 may be inserted in the door glass run 5 so that the window glass 3 is guided.

A door weather strip 7 may be inserted in and attached at the third receiving groove 215 of the center pillar portion 21. The door weather strip 7 may be interposed between a vehicle body 8 and the door to maintain air-tightness when the door is closed.

Figure 5:
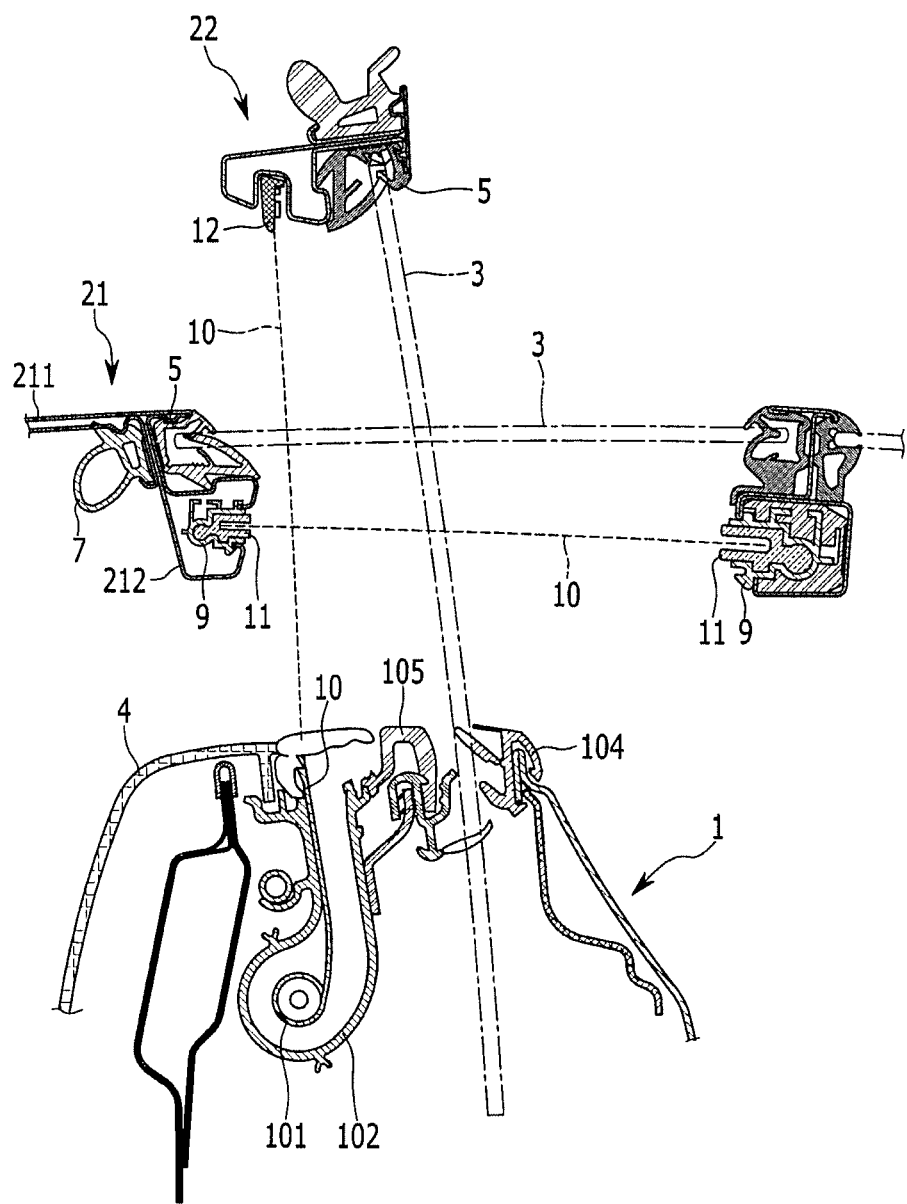
FIG. 5 is a cross-sectional view of a door for a vehicle having the door curtain mounting structure for the vehicle according to an exemplary embodiment of the present disclosure.

Referring to FIG. 5 according to an exemplary embodiment of the present disclosure, a guide rail 9 may be inserted in and fixedly attached at the second receiving groove 214. Sliders 11 may be attached at left and right edges of the door curtain 10, and the sliders 11 may be inserted in and coupled to the guide rail 9 so that the sliders 11 is moved along the guide rail 9.

Figure 6:
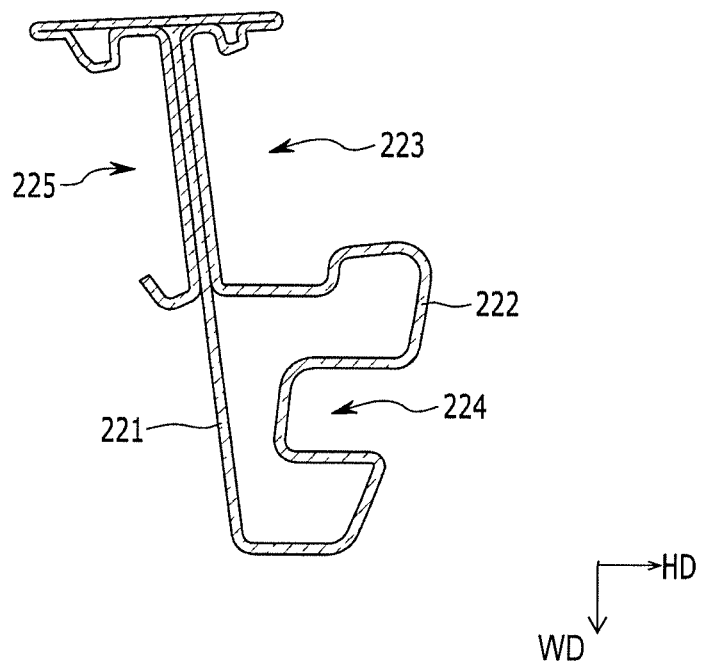
FIG. 6 is a cross-sectional view of a roof portion of the door frame at section B-B in FIG. 2 according to an exemplary embodiment of the present disclosure.

Referring to FIG. 6, a cross-sectional view of the roof portion 22 of the door frame 2 at section B-B in FIG. 2 according to an exemplary embodiment of the present disclosure, the roof portion 22 may include a roof body 221 extended in the length direction LD of a vehicle and a downward protrusion portion 222 protruded downward from the roof body 221 in the height direction HD of a vehicle.

Three of first, second and third receiving grooves 223, 224 and 225 each having an opening at one side thereof may be formed at the downward protrusion portion 222.

The first and second receiving grooves 223, 224 may be formed to be opened downward in the height direction HD of a vehicle and the third receiving groove 225 may be formed to be opened upward in the height direction HD of a vehicle.

Figure 7:
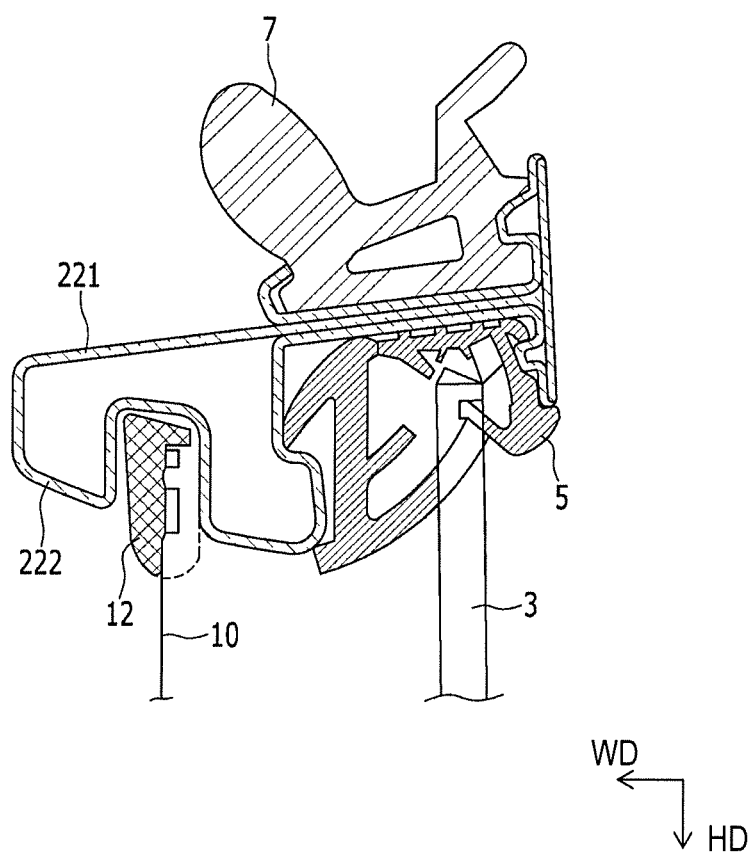
FIG. 7 is a cross-sectional view in a state that a door curtain is received in the roof portion of the door frame at section B-B in FIG. 2 according to an exemplary embodiment of the present disclosure.

Referring to FIG. 7, the door glass run 5 may be inserted in and mounted at the first receiving groove 223 of the roof portion 22.

A rim 12 may be mounted at an upper edge of the door curtain 10. The rim 12 the door curtain 10 may be inserted in the second receiving groove 224 of the roof portion 22 when the door curtain 10 is extended to block the window glass 3.

Figure 8:
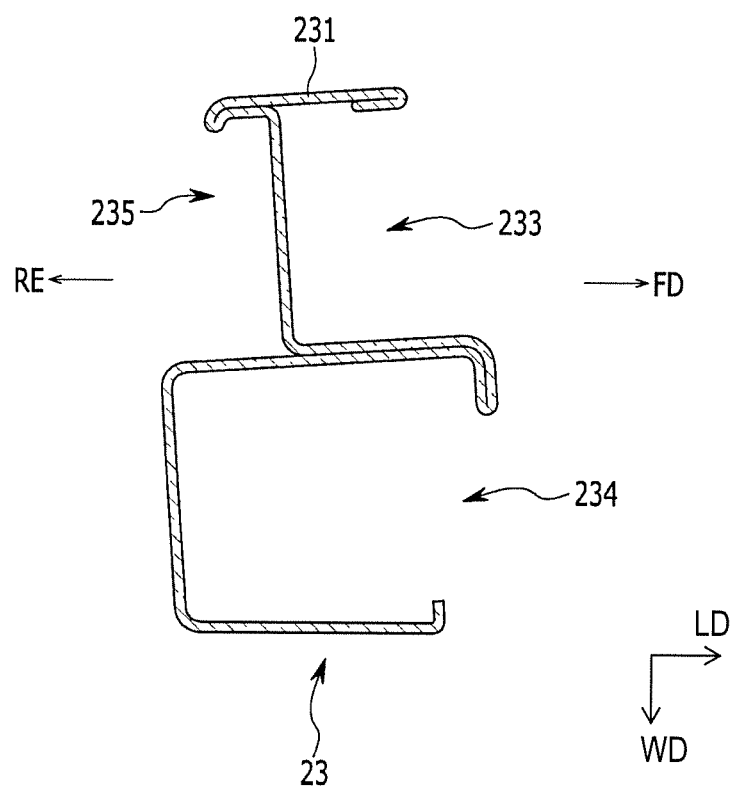
FIG. 8 is a cross-sectional view of a division channel of the door frame at section D-D in FIG. 2 according to an exemplary embodiment of the present disclosure.
Figure 9:
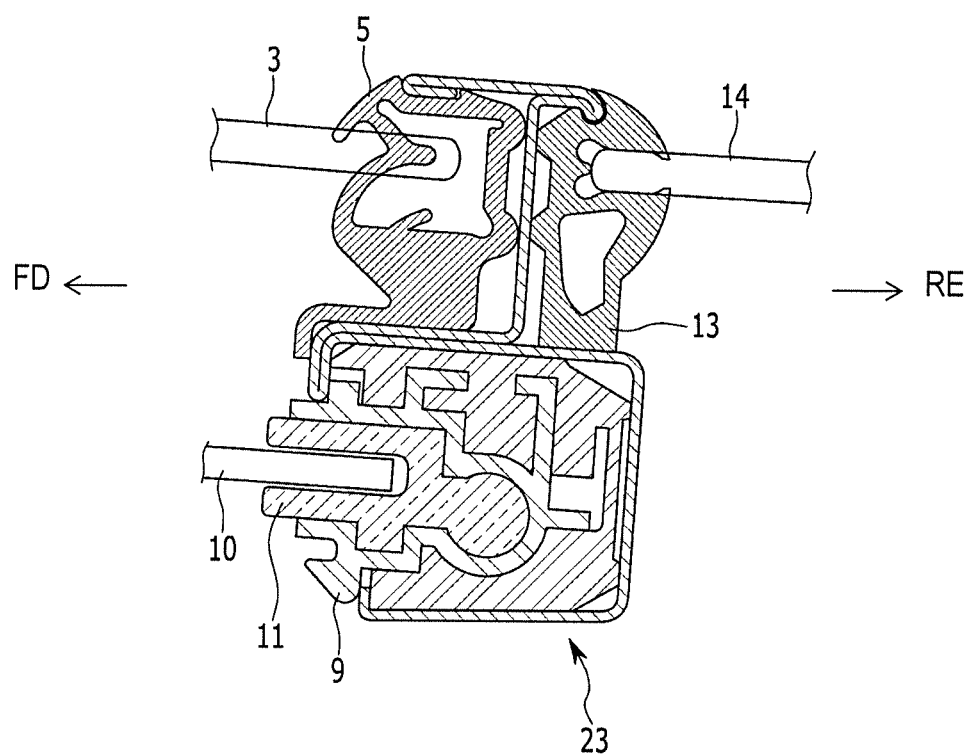
FIG. 9 is a cross-sectional view in a state that a door curtain is received in the division channel of the door frame at section D-D in FIG. 2 according to an exemplary embodiment of the present disclosure.

Referring to FIG. 8 and FIG. 9, cross-sectional views of the division channel 23 of the door frame 2 at section D-D in FIG. 2 according to an exemplary embodiment of the present disclosure, the division channel 23 may include a channel body 231 extended in the height direction HD of a vehicle, and a first and a second receiving grooves 233, 234 opened in a forward direction of the vehicle FD and a third receiving groove 235 opened in a rear direction RE of the vehicle may be provided at the channel body 231.

The door glass run 5 may be inserted in and attached at the first receiving groove 233 of the division channel 23, the guide rail 9 may be inserted in and attached at the second receiving groove 234 of the division channel 23, and the slider 11 of the door curtain 10 may be movably coupled to the guide rail 9. A weather strip 13 may be inserted in and attached at the third receiving groove 235 of the division channel 23 and a fixed window glass 14 may be inserted in and supported by the weather strip 13.

Figure 10:
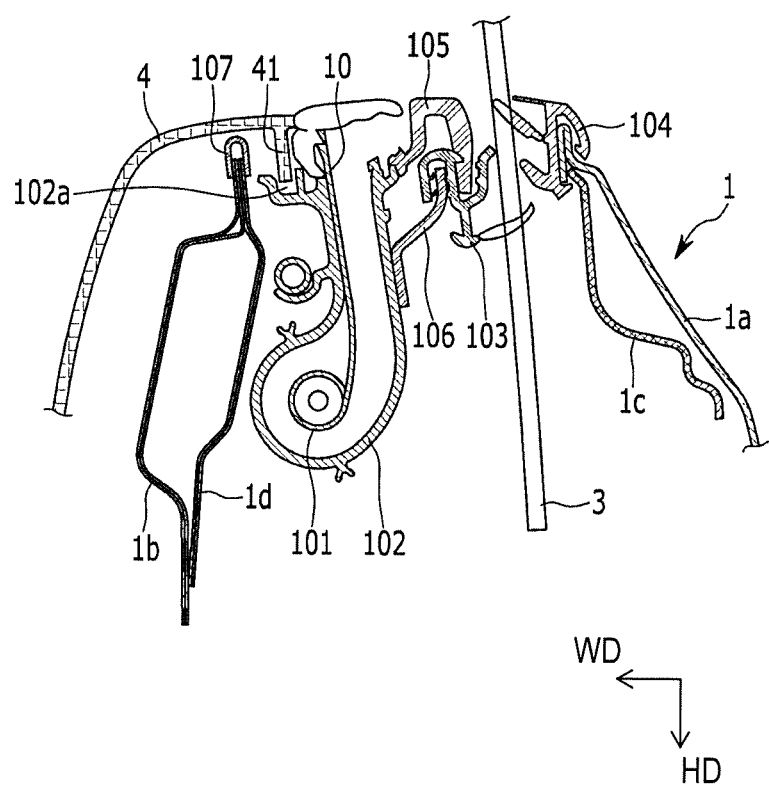
FIG. 10 is a cross-sectional view at section A-A in FIG. 2 around a door belt of the door for the vehicle having the door curtain mounting structure according to an exemplary embodiment of the present disclosure.

Referring to FIG. 10, a cross-sectional view around a door belt of the door at section A-A in FIG. 2 according to an exemplary embodiment of the present disclosure, the door panel 1 may include a door outer panel 1a located outside the door panel 1 and a door inner panel 1b positioned inside the door panel 1 in the width direction WD of the vehicle, and the door outer panel 1a and the door inner panel 1b are coupled to each other to form a receiving space therein.

A door curtain housing 102 may be inserted in the receiving space and supported by the door trim 4.

A door curtain roll 101 is received inside the door curtain housing 102 and rotatably supported by the door curtain housing 102, and a door curtain 10 may be wound on the door curtain roll 101.

An extended flange 106 may be provided at one side of the door curtain housing 102 and an inside belt 103 may be hung on the extended flange 106.

A cover 105 shutting a portion of the inside belt 103 and an end portion of the extended flange 106 from a top portion of the inside belt 103 may be provided at an upper portion of the door curtain housing 102.

An outer rail 1c may be coupled to the door outer panel 1a and an outer side belt 104 may be coupled to a portion where the outer panel and the outer rail are coupled to each other.

An inner rail 1d may be coupled to the door inner panel 1b and an inner belt 107 may be coupled to a portion where the inner rail 1d and the door inner panel 1b are coupled to each other. The door curtain housing 102 may be disposed between the inner rail 1d and the outer panel 1a.

The door curtain housing 102 may include a coupling groove 102a formed at an upper portion thereof and a door flange 41 may be provided on the door trim 4 so that the coupling flange 41 is fitted into the coupling groove 102a in order for the door curtain housing 102 to be supported by the door trim 4.

This disposition structure may prevent the door from damage to the door trim 4 by widening a gap between the inner rail 1d and the door inner panel 1b and the window glass 3, reduce man hour and cost for assembly of the door, and increase stiffness of the door.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A door curtain mounting structure for a vehicle, comprising:
    a door panel having a door inner panel disposed and a door outer panel disposed inside and outside thereof, respectively, in a width direction of the vehicle, and a receiving space formed between the door inner panel and the door outer panel;
    a door frame coupled to the door panel in order to form a door window opened and closed by a window glass;
    a door trim disposed inside the door inner panel in the width direction of a vehicle; and
    a door curtain housing in which a door curtain blocking the window glass inside in the width direction of a vehicle is received, the door curtain coupled to the door trim and disposed between the door inner panel and the door outer panel,
    wherein an inner rail is coupled to the door inner panel and an outer rail is coupled to the door outer panel.

2. The door curtain mounting structure for the vehicle of claim 1, wherein an inner belt is attached at a portion where the door inner panel and the inner rail are coupled to each other.

3. The door curtain mounting structure for the vehicle of claim 1, wherein an outer side belt is attached at a portion where the door outer panel and the outer rail are coupled to each other.

4. The door curtain mounting structure for the vehicle of claim 2, wherein an extended flange is provided at one side of the door curtain housing and an inside belt is hung on the extended flange.

5. The door curtain mounting structure for the vehicle of claim 4, wherein a cover, shutting a portion of the inside belt and an end portion of the extended flange from a top portion of the inside belt, is further provided at an upper portion of the door curtain housing.

6. The door curtain mounting structure for the vehicle of claim 1, wherein the door frame comprises:
   a center pillar portion of which a first end portion is coupled to the door panel and a second end portion is formed to be extended in a height direction of a vehicle, and faced to a center pillar of a vehicle body when a door of the vehicle is closed;
   a roof portion formed to be extended from the second end portion of the center pillar portion in a length direction of a vehicle and faced to a roof of the vehicle body when the door is closed; and
   a division channel being coupled to the roof portion to be extended downward in the height direction of a vehicle and separating an opening/closing window and a fixed window of the door.

7. The door curtain mounting structure for the vehicle of claim 6, wherein the center pillar portion comprises:
   a pillar portion formed to be extended in the height direction of a vehicle; and
   a protrusion portion protruded from the pillar portion in the width direction of a vehicle,
   wherein a first receiving groove, a second receiving groove and a third receiving groove of the center pillar portion, each having an opening at one side thereof, are formed at the protrusion portion,
   the first and second receiving grooves of the center pillar portion are disposed in the width direction of a vehicle, and
   the third receiving groove of the center pillar portion is disposed forward with respect to the first receiving groove in the length direction of a vehicle.

8. The door curtain mounting structure for the vehicle of claim 7, wherein a door glass run for supporting the window glass is inserted into the first receiving groove of the center pillar portion,
   a door weather strip is inserted into and attached at the third receiving groove of the center pillar portion, and
   a portion of the door curtain is inserted into the second receiving groove of the center pillar portion.

9. The door curtain mounting structure for the vehicle of claim 8, wherein a guide rail is inserted into and mounted at the second receiving groove of the center pillar portion,
   a slider is attached at left and right edges of the door curtain, and
   the slider is inserted into and coupled to the guide rail to be moved along the guide rail.

10. The door curtain mounting structure for the vehicle of claim 8, wherein the roof portion comprises:
   a roof body extended in the length direction of a vehicle; and
   a downward protrusion portion protruded downward from the roof body in the height direction of a vehicle,
   wherein three of first, second and third receiving grooves of the roof portion, each having an opening at one side thereof, are formed at the downward protrusion portion,
   the first and second receiving grooves of the roof portion are opened downward in the height direction of a vehicle, and
   the third receiving groove of the roof portion is opened upward in the height direction of a vehicle.

11. The door curtain mounting structure for the vehicle of claim 10, wherein the door glass run is inserted into and mounted at the first receiving groove of the roof portion,
   a rim is mounted at an upper edge of the door curtain,
   the rim of the door curtain is inserted into the second receiving groove of the roof portion when the door curtain is extended to block the window glass, and
   the door weather strip is inserted into and attached at the first receiving groove of the roof portion.

12. The door curtain mounting structure for the vehicle of claim 9, wherein the division channel comprises:
   a channel body extended in the height direction of a vehicle; and
   a first receiving groove and a second receiving groove opened in a forward direction of the vehicle and a third receiving groove opened in a rear direction of the vehicle, the first, second, and third receiving grooves being provided at the channel body.

13. The door curtain mounting structure for the vehicle of claim 12, wherein the door glass run is inserted into and attached at the first receiving groove of the division channel,
   the guide rail is inserted into and attached at the second receiving groove of the division channel, and
   the slider of the door curtain is movably coupled to the guide rail.

14. The door curtain mounting structure for the vehicle of claim 13, wherein a weather strip is inserted into and attached at the third receiving groove of the division channel, and
   a fixed window glass is inserted into and supported by the weather strip.

* * * * *